(12) United States Patent
Nagarajaiah et al.

(10) Patent No.: US 8,379,839 B2
(45) Date of Patent: Feb. 19, 2013

(54) METHOD AND APPARATUS FOR CONTROLLING RINGING VOLTAGE

(75) Inventors: Yadunandan Nagarajaiah, Austin, TX (US); Michel Darveau, Gatineau (CA); Eric Bass, Austin, TX (US)

(73) Assignee: Microsemi Semiconductor (U.S.) Inc., Austin, TX (US)

( * ) Notice: Subject to any disclaimer, the term of this patent is extended or adjusted under 35 U.S.C. 154(b) by 744 days.

(21) Appl. No.: 12/537,914

(22) Filed: Aug. 7, 2009

(65) Prior Publication Data

US 2011/0033039 A1    Feb. 10, 2011

(51) Int. Cl.
  *H04M 1/00* (2006.01)
  *H04M 9/00* (2006.01)
(52) U.S. Cl. .................................. 379/413.01
(58) Field of Classification Search ............. 379/413.01
   See application file for complete search history.

(56) References Cited

U.S. PATENT DOCUMENTS

| | | | |
|---|---|---|---|
| 6,377,681 B1 | 4/2002 | Bremner | |
| 6,735,302 B1* | 5/2004 | Caine et al. | 379/405 |
| 2004/0120512 A1* | 6/2004 | Ploumen et al. | 379/413 |
| 2004/0174985 A1* | 9/2004 | Apfel | 379/387.01 |
| 2004/0174992 A1 | 9/2004 | Apfel | |
| 2005/0063534 A1* | 3/2005 | George | 379/399.01 |
| 2006/0088155 A1 | 4/2006 | Enriquez et al. | |

FOREIGN PATENT DOCUMENTS

GB    2102249 A    1/1983

OTHER PUBLICATIONS

European Search Report from Application No. 10251374.4-2414 dated Dec. 2, 2010.
English Translation of Notice of Preliminary Injection from Korean application No. 10-2010-0075446 dated Sep. 2, 2011.

* cited by examiner

*Primary Examiner* — Alexander Jamal
(74) *Attorney, Agent, or Firm* — Williams, Morgan & Amerson, P.C.

(57) ABSTRACT

A method for controlling power dissipated in a subscriber line interface circuit includes measuring a power parameter of the subscriber line interface circuit during a ringing cycle, comparing the measured power parameter to a target power parameter and adjusting at least one ringing parameter of a ringing signal generated by the subscriber line interface circuit based on the comparison. A line card includes a subscriber line interface circuit operable to generate a ringing signal, and a subscriber line audio-processing circuit operable to measure a power parameter of the subscriber line interface circuit during a ringing cycle, compare the measured power parameter to a target power parameter, and adjust at least one ringing parameter of the ringing signal based on the comparison.

28 Claims, 7 Drawing Sheets

METHOD AND APPARATUS FOR CONTROLLING RINGING VOLTAGE

CROSS-REFERENCE TO RELATED APPLICATIONS

Not applicable.

BACKGROUND

The disclosed subject matter relates generally to telecommunications and, more particularly, to a method and apparatus for controlling ringing voltage.

In communications systems, particularly telephony, it is common practice to transmit signals between a subscriber station and a central switching office via a two-wire bidirectional communication channel. A line card generally connects the subscriber station to the central switching office. A line card typically includes at least one subscriber line interface circuit (SLIC) as well as a subscriber line audio-processing circuit (SLAC). The functions of the line card include range from supplying talk battery to performing wake-up sequences of circuits to allow communications to take place.

Subscriber line interface circuits (SLICs) have been developed to provide an interface between a low voltage signal path in a telephone central office and a high-voltage telephone subscriber line. The SLIC provides functions such as off hook detection, ringing signal generation, and battery feed to the subscriber line. The subscriber line consists of a telephone transmission line, including two conductors referred to as A and B or tip and ring, and the subscriber telephone equipment coupled across the tip and ring conductors (i.e., the load). The subscriber line and the subscriber telephone equipment are also referred to as a subscriber loop.

The SLIC provides power from the telephone central office to the subscriber line in response to a received battery voltage. The battery voltage is a DC voltage supplied to the SLIC to power the SLIC and the subscriber line. A typical value of the battery voltage is −48 VDC. The battery voltage has a value generally in the range −20 to −60 VDC. The SLIC supplies a DC current at the battery voltage to the subscriber line. Superimposed on the DC current are AC signals of audio frequency by which information is conveyed between the subscriber and the central office. The battery voltage is generated at the central office, either by a depletable energy storage device such as a battery or by a DC generator, for supply to the SLIC. In a central office, one battery or DC generator supplies the battery voltage to many SLICs and their associated subscriber loops.

In many modern applications, a SLIC is located remote from the central office, relatively close to the subscriber telephone equipment and coupled to the subscriber telephone equipment by a relatively short subscriber line. For example, in fiber in the loop (FITL) applications, the SLIC is located in the same city neighborhood as the subscriber telephone equipment and is coupled to the subscriber telephone equipment by tip and ring conductors no more than a few hundred feet in length. The SLIC or an associated circuit receives optical signals from the central office over an optical fiber and converts the optical signals to AC electrical signals. In response to the electrical signals, the SLIC supplies AC signals of audio frequency, along with DC power from the battery, to the subscriber line. In such applications, where the SLIC and battery are remote from the central office, one battery or battery voltage generator may supply the battery voltage to only one or a few SLICs and their associated subscriber loops.

In applications where a SLIC is used in a central office and there are short lines, the loop voltage drop is low, resulting in a high voltage drop and consequently high power dissipation in the SLIC. In a dense environment of such devices, related heating can cause failures. In addition, with SLICs having resistive feed characteristics used in short lines, current is higher, further compounding this problem.

Newer generation chipsets are designed to operate in high density line card applications. The limited board space available in such line cards constrains the size of the package that is available for the devices like the SLIC and the SLAC. Another consideration that also reduces the size of the package is the desire to have lower per line cost for the line card. In general the smaller packages do not present a problem when the associated device does not generate significant heat. However for silicon devices, like the SLIC, that interface with the telephone line, the reduced silicon die size and the reduced package size coupled with the requirement of having to drive out heavy duty ringing signals to the telephony equipment present a challenging design problem with respect to heat generation.

In general, the ringing state is a challenging state in terms of power dissipation for the SLIC device. In a ringing state, the SLIC makes use of all of the available battery sources to drive out the maximum ringing signal. The rationale behind driving out the maximum possible ringing is that the SLIC needs to apply upwards of 40 Vrms for the ringing signal at the longest loop (>1900 ohms) across a ringer load that is at least 5 REN. REN stands for Ringer Equivalent Number. It is a measurement of how much ringing power certain telephone equipment takes. REN numbers are used in the United States to designate how many pieces of telephony equipment can be connected to the same subscriber line and still get them ringing properly.

When the same ringing voltage specifications that were derived to meet the specifications for the long loops are applied to heavy REN loads (e.g., 5C4A or 10K in parallel with 8 uF) with little or no loop in between the SLIC and the load, substantial SLIC power dissipation is present due to the smaller magnitude of the load impedance and due to the phase shifted load current with respect to the drive voltage. The phase shifted load current reaches its peak value when the load voltage is minimum and hence the drop across the SLIC is maximum. This condition results in significant SLIC power dissipation. This power dissipation is illustrated in the following equation:

$$P_{SLIC} = P_{Battery} - P_{Load} + P_{CurSense}, \quad (1)$$

where $P_{SLIC}$ is the average power dissipated in the SLIC, $P_{Battery}$ is the power drawn from the battery, $P_{Load}$ is the power dissipated in the all of the load (i.e., telephony equipment and loop), and $P_{CurSense}$ is the power dissipated in the current sense resistors of the SLIC.

Expanding the individual power components yields:

$$P_{SLIC} = \frac{2 \cdot V_{Bat} \cdot V_{Ring}}{\pi \cdot |Z_{OVL}|} - \frac{\cos(\angle Z_{OVL}) \cdot V_{Ring}^2}{2 \cdot |Z_{OVL}|} + \frac{R_{CurSense} \cdot V_{Ring}^2}{2 \cdot |Z_{OVL}|^2}, \quad (2)$$

where $V_{Bat}$ is equal to the total battery voltage applied across the SLIC (VBP−VBH), $V_{Ring}$ is the peak ringing voltage generated by the SLIC, $Z_{OVL}$ is the overall complex load including the internal current sense resistors of the SLIC, fuse resistors, loop resistance, and the REN load, $R_{CurSense}$ is the sum of the current sense resistors used in the SLIC. Equation (2) is derived for a sinusoidal ringing waveform without any DC bias during ringing.

The first equation indicates that the power dissipated in the SLIC should be equal to power drawn from the battery, less the power that is delivered to the load. The third term comes in to play because the SLIC has small current sense resistors that are used to measure the load current. Since these resistors also dissipate power, the SLIC power includes this term. The second equation indicates various power components in terms the applied battery voltages, generated ringing voltages, and the overall load impedance and the SLIC current sense resistor. Note that the $P_{Load}$ component of the power would be zero if the phase shift introduced by the load circuit is 90 degrees. This condition is approached for heavily reactive loads like 10K∥8 uF and 5C4A REN loads. For these cases, the SLIC power increases as the generated ringing signal is increased. For resistive types of REN loads, the load power would have zero degree phase shift and hence more power would be delivered to the load, thus decreasing the power dissipated in the SLIC.

As an example case, assuming $V_{Bat}$=VBP−VBH=90V−(−60V)=150V, $Z_{OVL}$=$R_{CurSense}$ (36 ohms)+2*$R_{Fuse}$(50 ohms)+0 ohm loop+10K∥8 uF Pretrip REN load, at 20 Hz ringing frequency (i.e., $Z_{OVL}$=233.98−984.97j), $V_{Ring}$=130V peak ringing with no DC bias, the power dissipated in the SLIC is $P_{SLIC}$=12.2623−1.929+0.2968=10.63 W. Hence, the SLIC is being asked to dissipate more than 10 W of power. Such a power dissipation would generate considerable amount of heat from the SLIC device. To remove the resulting heat generated from the SLIC at this power would require additional surface area for better thermal conductivity, thereby reducing the density of the line card. This condition works against the design objectives of lower cost and reduced overall board size. Note that similar SLIC power dissipation conditions would arise even for the 5C4A types of REN load as well under the same conditions.

The ring-trip conditions present another challenge to the SLIC in terms of SLIC power dissipation. Some devices have a hardware analog current limit circuit that limits the loop current (e.g., around 100 mA). Such a mechanism is employed to prevent the transformer magnetic core saturation in the integrated voice and data (IVD) splitters and hence to prevent cyclic redundancy check (CRC) errors in the IVD and excessive current draw from the power supply connected to the line car. The current limiting circuit acts when the subscriber goes off-hook while ringing or during typical DC feed conditions. The hardware current limit circuit limits the loop current even before the firmware has had a chance to react to detect the ring-trip. When the subscriber goes off-hook while ringing the phone, in a short loop application, most likely the hardware current limit circuit will limit the load current. The hardware current limit circuit accomplishes limiting the loop current by reducing the voltage applied across tip/ring leads. Assuming the system has 136 ohms of fixed resistance (fuse and current sense resistors in the SLIC) and a 200 ohm off-hook resistance, the current limit circuit would limit the voltage across this load to the assumed current limit of 100 mA times 336 ohms volts, unless of course the voltage across the load is smaller than this voltage. So, while ringing, when the user goes off-hook the voltage across the load would be a clipped sine wave whose magnitude at the generator has a peak voltage of 33.6V. If the battery applied made use of during ringing is 150V, the remaining 150V−33.6V+3.6V=120V is dropped across the SLIC. This condition implies a SLIC power of 12 W under current limit conditions. Again, this level of SLIC power dissipation works against the design objectives of lower cost and reduced overall board size.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method for controlling power dissipated in a subscriber line interface circuit which includes measuring a power parameter of the subscriber line interface circuit during a ringing cycle, comparing the measured power parameter to a target power parameter and adjusting at least one ringing parameter of a ringing signal generated by the subscriber line interface circuit based on the comparison.

Another aspect of the disclosed subject matter is seen a line card which includes a subscriber line interface circuit operable to generate a ringing signal, and a subscriber line audio-processing circuit operable to measure a power parameter of the subscriber line interface circuit during a ringing cycle, compare the measured power parameter to a target power parameter, and adjust at least one ringing parameter of the ringing signal based on the comparison.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
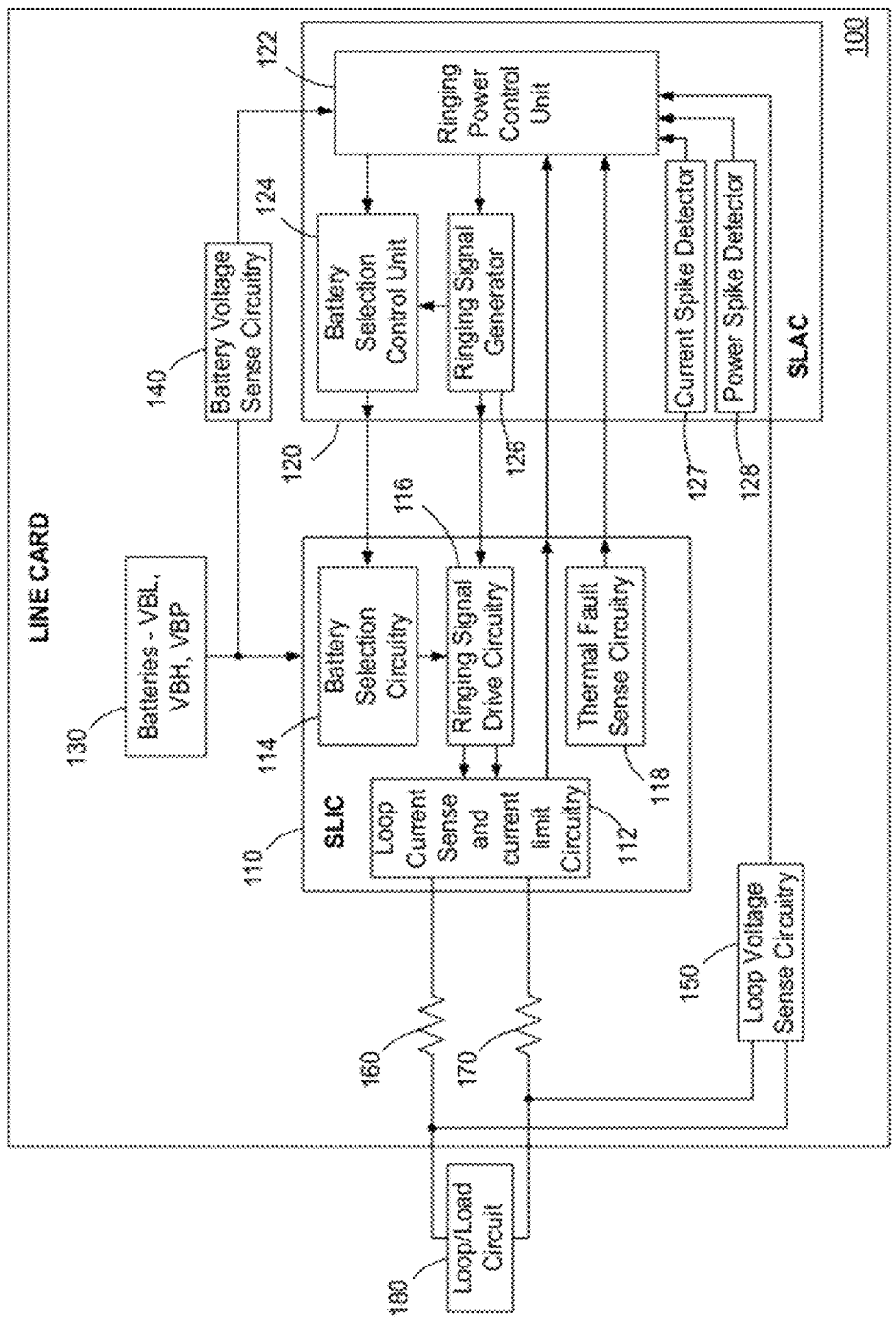
FIG. 1 is a simplified block diagram of a line card in accordance with one illustrative embodiment of the present subject matter.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of a simplified block diagram of an exemplary line card 100. The line card 100 includes a subscriber line interface circuit (SLIC) 110, a subscriber line audio-processing circuit (SLAC) 120, batteries 130 (i.e., VBL, VBH, VBP), battery voltage sense circuitry 140, loop voltage sense circuitry 150, and protection resistors 160, 170. The line card 100 interfaces with a loop/load circuit 180 representing the subscriber loop (i.e., telephony equipment at the customer premise and the subscriber line). The SLIC 110 includes loop current sense and current limit circuitry 112 for sensing the current output by the SLIC 110 and to provide a hardware limiting of that current, as described above, battery selection circuitry 114 for selecting between the various batteries 130 (i.e., VBL, VBH, VBP) provided to the SLIC 110, ringing signal drive circuitry 116 for driving the ringing signal, and thermal fault sensing circuitry 118 for outputting a signal responsive to the temperature of the SLIC 110 exceeding a predetermined threshold. The SLAC 120 includes a ringing power control unit 122 that acts to reduce power dissipated in the SLIC 110 during ringing events by controlling the ringing voltage and/or by switching the batteries 130, a battery selection control unit 124 for interfacing with the battery selection circuitry 114 of the SLIC 110 to designate which batteries 130 should be selected, a ringing signal generator 126 for providing the parameters of the ringing signal to the ringing signal drive circuitry 116 of the SLIC 110, a current spike detector 127, and a power spike detector 128. In an actual implementation, the line card 100 may have multiple SLICs 110, SLACs 120, and associated circuitry to service a plurality of subscriber loops.

As will be described in greater detail below, the ringing power control unit 122 acts to reduce power dissipated in the SLIC 110. For ease of illustration and to avoid obscuring the present subject matter, only the circuitry on the line card 100, SLIC 110, and SLAC 120 needed to support this functionality is illustrated in FIG. 1. Of course, in an actual implementation, other functional units and circuitry may be provided for performing other functions of the line card 100 as understood by those of ordinary skill in the art.

Referring back to Equations (1) and (2) above, the ringing power control unit 122 acts to reduce power dissipated in the SLIC 110 during ringing events to attempt to support the design objectives of lower cost and reduced overall board size. To evaluate the power dissipation conditions illustrated above, Equation (2) may be solved for a given target SLIC 110 power and an assumed load impedance. As the SLIC power equation is a second order quadratic equation, each solution provides an answer. If the roots of Equation (2) are complex in nature, it indicates that no level of ringing voltage within the supplied battery dissipates the target amount of SLIC power. So, under those conditions, the SLIC 110 can safely generate a user programmed ringing voltage without resulting in a power dissipation that is greater than the target power dissipation. When the roots of Equation (2) are real, any root whose magnitude is higher than the battery voltage cannot physically be generated and hence can be ignored. When the roots of the equations are real and are within the battery voltage limits, for those ringing voltages, the SLIC 110 would dissipate the target SLIC power.

The SLIC 110 is expected to deliver a specified ringing voltage for various loads and various loop lengths, without knowing in advance the load and loop conditions. Hence, an empirical solution to Equation (2) would only be applicable only to cases where the load and loop conditions are known. In such a case, the ringing voltage could be fixed by the SLAC 120, such that the power dissipation in the SLIC 110 matches the target power level. However, this solution would not be effective if the load (i.e., customer premises telephony device) or the loop conditions were changed. This solution would also cause a configuration control problem, due to the constant need to reconfigure the line card 100 if conditions were to change and for the initial customization at the installation site.

To implement power control, the ringing power control unit 122 receives measurements of various voltages and currents from the loop current sense and current limit circuitry 112, battery voltage sense circuitry 140, and loop voltage sense circuitry 150. Using these measured parameters, the ringing power control unit 122 computes the average SLIC power. The measured average SLIC power is compared against a target SLIC power (i.e., that may be a programmable or default value) to control the ringing voltage that is driven out by the SLIC 110.

Figure 2:
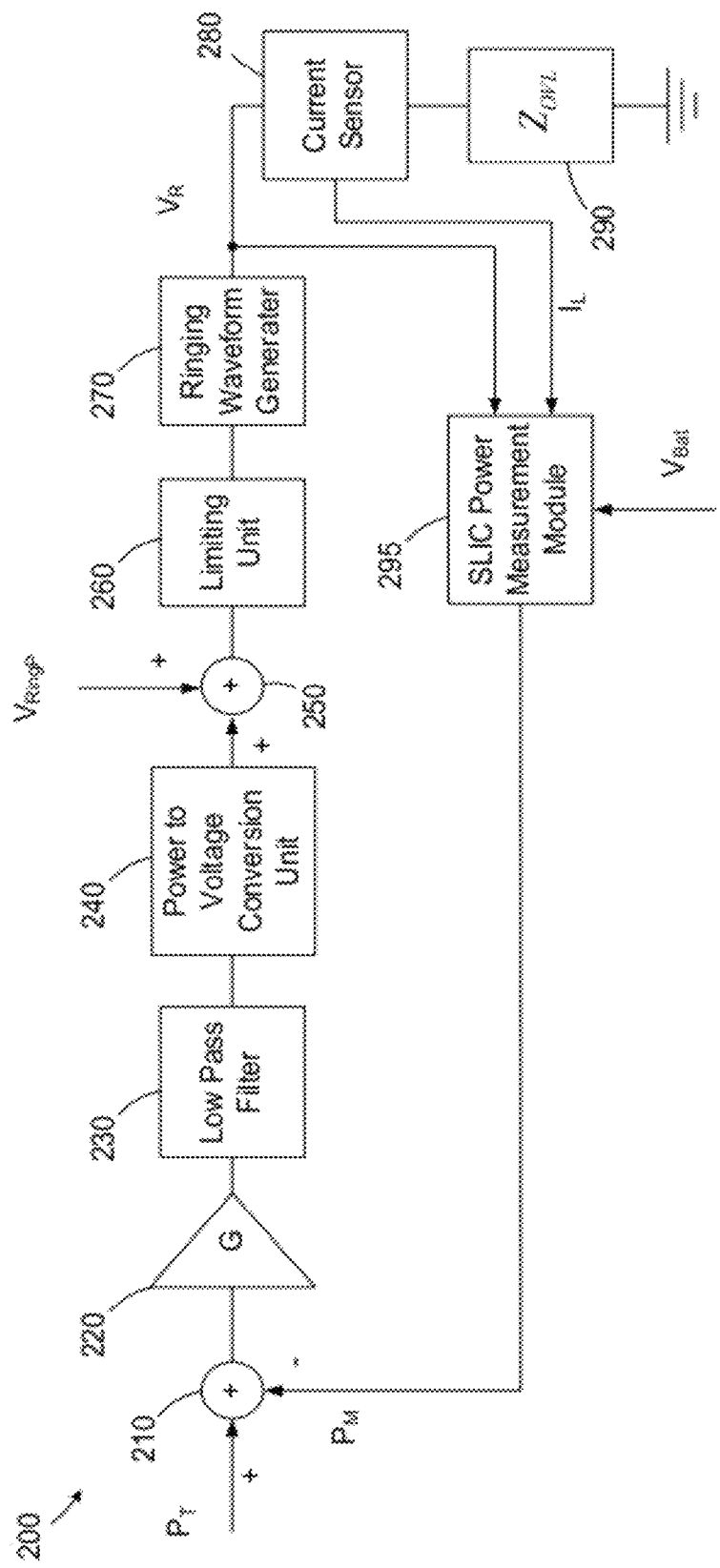
FIG. 2 is a simplified block diagram of a feedback control loop used for controlling the amplitude of a ringing signal generated by a subscriber line interface circuit in the line card of FIG. 1.

Turning now to FIG. 2, a simplified block diagram of a feedback control loop (FCL) 200 implemented by the ringing power control unit 122 for controlling the ringing voltage to limit the power dissipated in the SLIC 110. In general, the characteristics of the FCL 200 are:

the FCL has a small residual error such that the SLIC power dissipation under steady state conditions should be close to the target SLIC power;

the FCL does not generate a ringing voltage that is higher than a user-specified ringing voltage;

the FCL outputs the user specified ringing voltage if the load is such that the power dissipated in the SLIC 110 for the user specified voltage and the given load and battery conditions is less than the target SLIC power;

the FCL acts sufficiently fast when the load conditions change (i.e., from a heavy REN load to a low REN load, or vice versa), while at the same time having very little ripple in terms of ringing amplitude variations during the steady state;

the FCL should be able to store and recall necessary information such that the adaptation under a given set of conditions happen once and not every ringing burst;

the ringing amplitude changes are be applied during zero crosses of the ringing waveform such that no IVD spurii are introduced on the line; and the FCL is stable for all load and ringing and battery conditions.

The FCL 200 includes a subtractor 210 operable to receive the power target specified by the system designer, $P_T$, and the measured power, $P_M$, to generate an power error signal. The forward path of the FCL 200 connected to the subtractor 210 includes a gain unit 220 for determining the forward loop gain, G, of the FCL 200, a low pass filter 230, a power to voltage conversion unit 240 for outputting a voltage error signal corresponding to the power error signal, an adder 250 for adding the voltage error signal to the user programmed ring signal voltage, $V_{RingP}$, a limiting unit 260 for limiting the voltage to the user programmed ring signal voltage, a ringing waveform generator 270 for generating the ringing waveform, and current sensor 280 (e.g., the loop current sense and current limit circuitry 112 of FIG. 1) for measuring the drive current supplied to the load represented by the overall complex load 290 represented by $Z_{OVL}$. In the feedback path, a power measurement module 295 uses the line current, $I_L$, sensed by the loop current sense and current limit circuitry 112, the load voltage, $V_R$, sensed by the loop voltage sense circuitry 150, and the battery voltage applied across the SLIC 110, $V_{Bat}$, sensed by the battery voltage sense circuitry 140, to generate the power signal representing the power dissipated in the SLIC 110.

The value of the target power may vary depending on the particular design considerations (e.g., device density and line card size). One consideration when determining the appropriate target power is whether the ringing voltage associated with the selected target power is able to meet or exceed the minimum ringing voltage required for various REN loads. An exemplary value for the target power is about 3.5 W. The measured power, $P_M$, is the average SLIC power dissipated in the two preceding ringing half cycles, which may be represented by the Equation:

$$P_M = \frac{1}{T}\Big(\int V_{Bat} \cdot |I_L|dt - \int V_R \cdot I_L dt + \text{(other SLIC power dissipation)}\Big) \quad (3)$$

As the terms in the above equation are instantaneous samples, the integration is performed over the two preceding ringing half cycles, where T is the period of the ringing signal.

The gain of the gain unit 220 may be set to affect the dynamic response of the FCL 200. In the illustrated embodiment, the gain unit 220 is set so that the overall loop gain is about 25. Hence, G is set to a value of about 500. The gain is set to a high value because the voltage across a resistor varies as a function of the square root of power dissipated in that resistor. For complex loads, the relation is more complex. In any case, the high value for G allows the correction voltage to swing widely even for small power differences between the measured and target SLIC 110 power and can easily exceed the highest possible ringing voltage specified. The gain thus allows for very small residual error in the system. In the illustrated embodiment, the low pass filter 230 is a single pole low pass filter and is the dominant pole in the FCL 200. Its corner frequency determines the dynamics of the feedback loop. The corner frequency of the low pass filter 230 is controlled between two values. When conditions arise for the ringing power control unit 122 that would call for adjusting to a new load, to decrease the time to convergence, the corner frequency is increased to about 0.5 Hz without erasing the history present in the filter 230. At all other times the low pass filter 230 employs a corner frequency of about 0.05 Hz. The response of the FCL 200 may also be varied by changing the gain, G, instead of or in addition to the corner frequency. The gain of the voltage conversion unit 240, which transforms a quantity that has the units of the power to a quantity that has the units of voltage, is unity. The limiting unit 260 ensures that the FCL 200 does not produce a ringing signal amplitude that is larger than what the user has specified and also ensures that the ringing voltage does not fall below a minimum threshold voltage (e.g., 1 V peak). A condition by which the FCL 200 might attempt to generate more ringing voltage than programmed amplitude would occur if the actual SLIC power dissipation is less than the target value. This response would be contrary to the goal of minimizing the power dissipation, so the FCL 200 is only allowed to reduce the ringing voltage to reduce the SLIC power dissipation to the target power dissipation, not to increase the ringing voltage if the actual power dissipation is less than the target. The ringing waveform generator 270 generates the ringing waveform that is applied across the load 290. The inputs to the ringing waveform generator 270 are the ringing frequency and the peak amplitude. The ringing peak amplitude is altered during the zero cross phase of the ringing signal generation.

Figure 3:
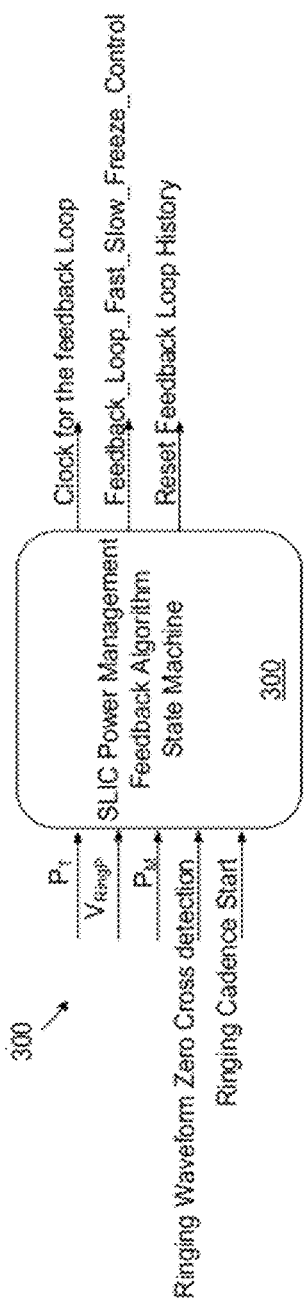
FIG. 3 is a diagram of a state machine for controlling the feedback control loop of FIG. 2.

The ringing power control unit 122 also employs a state machine 300 illustrated in FIG. 3 to accomplish the goals for the FCL 200 described above. The state machine 300 is responsible for enabling/disabling the FCL 200 and clocking the FCL 200 when it determines the FCL 200 needs to run. The state machine 300 clocks the FCL 200 at every zero cross of the ringing waveform. Thus, the ringing amplitude control algorithm runs at twice the ringing frequency. The state machine 300 employs several detectors that are used to detect conditions when the FCL 200 should be switched to fast convergence mode by changing the corner frequency of the low pass filter 230. These detectors make use of signals like change in user specified ringing amplitude, sudden change in the measured SLIC power (load change indication), etc. The state machine 300 also employs hysteresis (e.g., about 0.5 W) and time-outs (e.g., about 500 ms) that limit the transitions between the fast and slow convergence modes. The state machine 300 also disables the FCL 200 adaptation algorithm when any precursors to ring-trip have been identified (i.e., as described in greater detail below) or the ring-trip itself has been detected, since a ringing signal is not applied after a ring-trip. Allowing the FCL 200 to run during ring-trip would cause it to move away from the converged answer since during ring-trip, the SLIC 110 would be dissipating a different amount of power as compared to ringing.

The state machine 300 stores and recalls applicable parameters so that the FCL 200 does not have to converge on every ringing burst. For example, the state machine 300 stores the last ringing voltage applied by the FCL 200 for a ringing event. When a subsequent ringing event occurs, the state machine 300 configures the ringing waveform generator 270 to output the previously used ringing voltage. If the load conditions have not changed, the FCL 200 would not need to further adjust the ringing voltage. However, if the load conditions had changed between ringing cycles, the FCL 200 would automatically reduce the ringing voltage from the previous value if the power dissipated is greater than the target or increase the ringing voltage to the maximum specified ringing voltage if the power is less than the target power, and the previous ringing voltage is less than the maximum.

Figure 4:
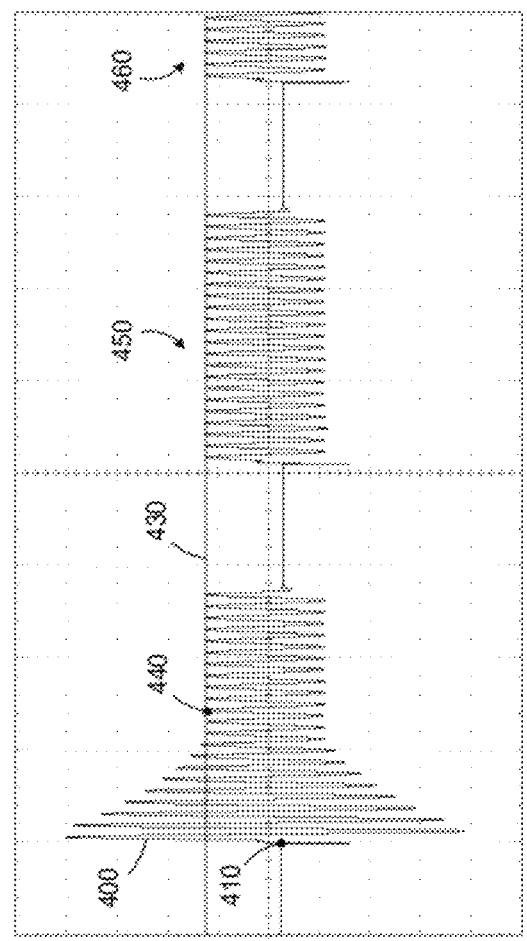
FIG. 4 is a diagram of a ringing signal controlled by the feedback control loop of FIG. 2.

FIG. 4 illustrates the operation of the FCL 200 during a series of exemplary ringing cycles. For ease of illustration, only the ring voltage waveform 400 is shown. Starting from a reset at point 410, the FCL 200 reacts to the SLIC power being greater than the target power by reducing the ringing amplitude in the first few cycles of ringing in the first ringing burst 420 and converges at the ringing voltage 430 that results in the SLIC 110 dissipating the target power at point 440. In the subsequent ringing bursts 450, 460, the state machine 300 provides the previous amplitude 430 to the FCL 200 so that it is substantially converged at the starts of the ringing bursts 450, 460.

In the illustrated embodiment, the ringing power control unit 122 also reduces power dissipated in the SLIC 110 by changing the selection of batteries 130 to switch out those batteries that are not necessary to support the ringing signal. For example, the maximum battery configuration is only needed at the peaks of the ringing signal. As the ringing signal approaches the zero crossings, the actual voltage required is significantly less. Hence, the ringing power control unit 122 cooperates with the battery selection control unit 124 to direct the battery selection circuitry 114 in the SLIC 110 to select the appropriate batteries 130. In a simple example, the battery selection control unit 124 directs the battery selection circuitry 114 to switch from VBH to VBL during some portion of the ringing cycle depending on the amplitude of the ringing voltage that is being generated and the battery voltages themselves. In another example, both the positive and the negative batteries 130 may be switched. In case of heavy REN load scenarios where there is a substantial phase difference between the ringing voltage and the ringing current, the SLIC 110 power dissipation savings brought about due to battery switching can be significant. Simulation results have shown that about 0.5 to 0.75 W SLIC 110 power savings can be achieved for typical ringing scenarios, which is significant when compared to a total target power dissipation of approximately 3-4 W.

Figure 5A:
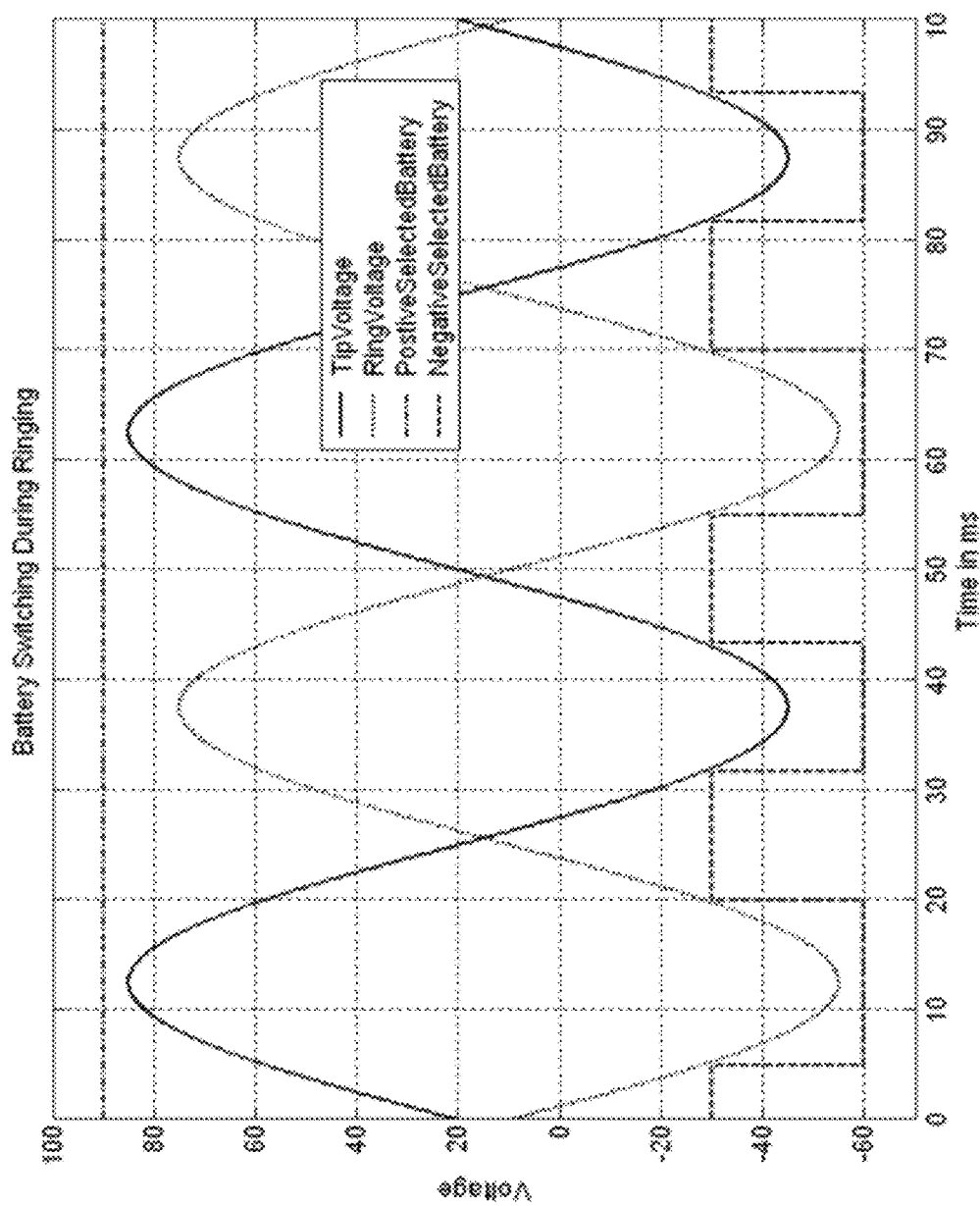
FIGS. 5A and 5B illustrate battery switching during the ringing cycle implemented by the line card of FIG. 1.
Figure 5B:
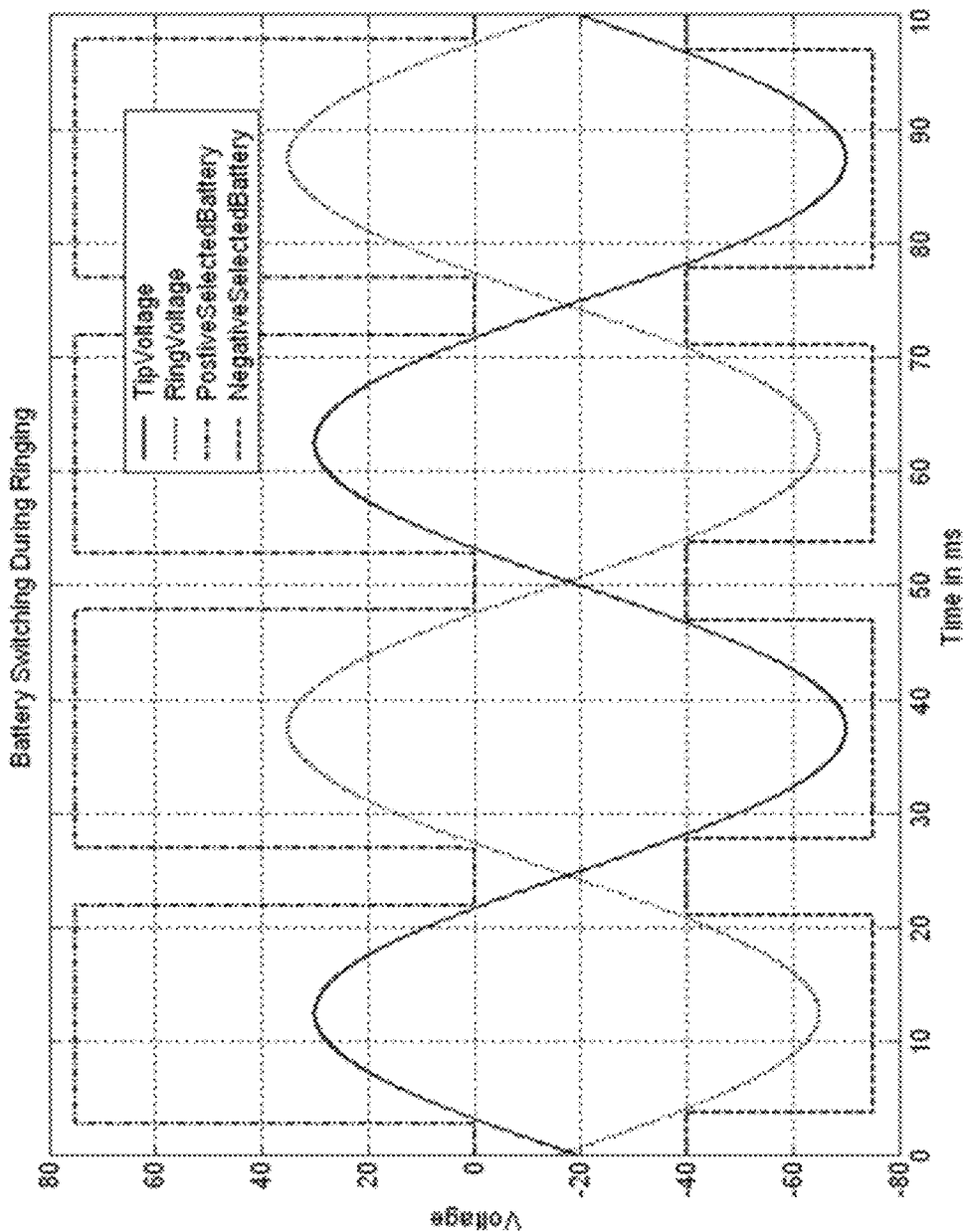

FIGS. 5A and 5B illustrate the battery switching cycle employed by the battery selection circuitry 114 at the direction of the battery selection control unit 124. In FIG. 5A, the battery selection control unit 124 cycles between the negative batteries (i.e., VBL or VBH), during the ringing cycle, and in FIG. 5B, the battery selection control unit 124 switches both the positive battery (i.e., VBP or ground) and the negative batteries (i.e., VBL or VBH).

When highly reactive REN loads (e.g., 10K‖8 uF or 5C4A—British Telecom ringer load specification), there can be substantial phase shift in the load current. In other words, as the ringing voltage across the load is decreasing, the current through the load increases due to the phase shift between the voltage and current in the highly reactive loads. Note that as the voltage across the load is decreasing, the voltage across the SLIC 110 is increasing, because the voltage drop across the SLIC 110 is the power supply minus the load voltage. The increased SLIC 110 voltage drop and increased load current results in increased SLIC 110 power dissipation.

The battery selection control unit 124 employs battery switching during ringing because when the voltage across the load is smaller, only a smaller power supply is required. So, when the voltage signals driven out on the tip and ring leads are such that they can be supported with a smaller available battery, then the battery switching may be performed. Hence, whether or not battery switching can take place depends on the ringing signal generation configuration, which includes the ringing DC bias, the ringing sinusoidal signal amplitude, and the battery voltages.

The battery selection control unit 124 generates the control signals necessary for the battery selection circuitry 114 to make the battery selections. There are various factors that are considered when implementing the switching logic. There may be delays involved in issuing or acting on the battery switching command with respect to the ringing waveform generation signal path. There may be also delays involved in implementing the battery switching once the command is received. Delays may also be introduced by external or internal filters that are present between the ringing signal generation (i.e., in the software) and the final power amplifier. These delays could cause signal clipping if the switching does not account for them. Headroom factors may be employed in the switching so that the switching does not occur at the exact battery thresholds, but rather only after the threshold and the headroom factor have been met.

The following pseudo-code represents the logic employed by the battery selection control unit 124 for battery switching in one embodiment:

```
% Postive Battery Selection Logic
positiveSelectedBat(i) = vbp; % Assume VBP is needed
if   (vTipAbs(i)   +   posBatterSwitchHeadRoom   <=   0)   &&   (vRingAbs(i)   +
         posBatterSwitchHeadRoom <= 0)
            positiveSelectedBat(i) = 0; % No need of VBP battery
end
% Negative Battery Selection Logic
negativeSelectedBat(i) = vbh; % Assume VBH is needed
```

```
if  (vTipAbs(i)  -  negBatterSwitchHeadRoom  >=  vbl)  &&  (vRingAbs(i)  -
    negBatterSwitchHeadRoom >= vbl)
        negativeSelectedBat(i) = vbl; % No need of VBH battery
end
where
    vTipAbs(i) and vRingAbs(i) are the instantaneous Tip and Ring lead voltages
        that are being driven out by the SLIC 110;
    posBatterSwitchHeadRoom  and  negBatterSwitchHeadRoom  are  voltage
        headrooms provided to prevent signal clipping in the positive and the
        negative batteries;
    vbp, vbl, vbh are the positive, low negative, and most negative battery
        voltages; and
    positiveSelectedBat(i) and negativeSelectedBat(i) are the variables that
        contain the selected battery voltages.
```

One technique for addressing the delays may be implemented by the battery selection control unit 124 by operating on the data samples that will be generated in a future time period. The horizon for the future time period may be selected based on the worst case delays expected in the system when selecting the higher battery (VBP or VBH) and by making use of the future and the present samples when selecting the lower battery (VBL or ground).

Another approach is to compute the worst case headroom increment factors reflected by the posBatterSwitchHeadRoom and negBatterSwitchHeadRoom variables to account for the delays. In one embodiment, the worst case headroom factor may be computed as a function of the phase at which the battery switching is expected to happen and, at that phase, the rate of change of the ringing voltage that is being generated. Using the phase at which battery switching is expected to happen, the battery selection control unit 124 can calculate how much the ringing voltage will change at that phase in a given time interval based on the worst case delay in the system. The computed voltage change can then be added to the fixed headroom computation.

Another significant factor associated with SLIC 110 power dissipation is the power dissipated during a ring-trip event. A ring-trip occurs when the telephony device goes off hook during a ringing cycle. The identification of the ring-trip terminates the ringing cycle, and the positive battery is removed. However, due to various requirements imposed by telecommunications standards to prevent spurious ring-trip indications, there is typically a delay between when the device goes off hook and the ring-trip is identified to allow debouncing of the off-hook event.

To reduce power dissipation in the SLIC 110 during a ring-trip, the ringing power control unit 122 attempts to identify a ring-trip in advance of the actual ring-trip detection. To that end, the ringing power control unit 122 identifies a ring-trip precursor indicator that suggests that a ring-trip is imminent. Exemplary ring-trip precursors include a current spike precursor, a power spike precursor, or a thermal fault precursor.

The current spike detector 127 is conventionally used to address the 200 ohm 12 ms no ring-trip, pre-trip load condition. The current spike detector 127 compares the instantaneous samples of the load current (e.g., running at a 2 KHz rate) to determine if the load current difference between the current samples is more than a user programmed threshold. Once such a condition is found, the ring-trip detection algorithm is disabled for 16 ms. The threshold of the current spike detector 127 may be set such that the detector 127 detects the application of a 200 ohm load at any phase of the ringing cycle. The ringing power control unit 122 interfaces with the current spike detector 127 to identify a ring-trip precursor when the threshold is met. Hence, when the current spike detector 127 detects a current spike and disables the ring-trip detection, the ringing power control unit 122 indicates a ring-trip precursor event.

Upon going off-hook, due to the nature of current limit circuitry 112, the power dissipation is the SLIC 110 jumps. The current may jump even if the current limit is not reached due to the rise in current. This current jump in the SLIC 110 may be used by the ringing power control unit 122 as another ring-trip precursor indicator. A power spike ring-trip precursor may be useful in markets where the 200 ohm 12 ms pre-trip condition is not applicable or when the current spike detector 127 fails to detect a current spike. The power spike detector 128 uses the SLIC 110 power dissipation as measured by Equation (3) above. Assuming the applied stimulus signal (i.e., ringing signal) is changing smoothly, the load circuit is unchanging, and there are no discontinuities in the transfer functions of various elements in the system, the derivative of the measured SLIC power should always be less than a predetermined quantify. The highest expected derivative can be computed for a given set of conditions. When a user picks up the phone (i.e., ring-trip) there is a discontinuous change in the system that causes the SLIC 110 power to jump suddenly. This jump could be further increased due to the action of the current limit circuitry 112 in the SLIC 110. Such a power jump would be pronounced in short and medium length loops.

The power spike detector 128 monitors the power difference between two successive SLIC power samples. Based on various simulations, the worst case power spike that can be expected under steady state ringing operations is less the 3 W. So, for the power spike detector 128, a threshold of about 3 W may be used to identify a ring-trip precursor.

A third ring-trip precursor detection technique employs the thermal fault sensing circuitry 118 of the SLIC 110. For example, the thermal fault sensing circuitry 118 may indicate a thermal fault in response to the temperature of the SLIC 110 exceeding a predetermined threshold (e.g., 180 degrees C.). The thermal fault sensing circuitry 118 is conventionally used to protect the SLIC 110 under fault conditions. In a typical deployment scenario, where in the system is placed close to the neighborhood without air conditioning, it is not unlikely that the line card 100 could be at a high temperature (i.e., as high as 85 degrees C.). Given the SLIC 110 packages and the thermal conductivity between the die of the SLIC 110 and the SLIC package, it is possible that the SLIC 110 die temperature could raise as much as 25 degrees C. per Watt of SLIC 110 power dissipation. Given the small thermal mass of the SLIC 110, the temperature of the SLIC 110 may raise very quickly. Hence, in response to a user picking up the phone, it is not unlikely that one will see a thermal fault. This is especially true if the ambient temperature is high and the SLIC 110 exhibits a power dissipation of about 3 W during ringing. The thermal fault event that indicates the ring-trip precursor, and any further thermal further faults that occur, are not reported to the SLAC 120 host processor until about at least 30 ms have elapsed. Only thermal faults that still persist after this time-out are reported to the host.

In response to identifying a ring-trip precursor, the ringing power control unit 122 initiates a reduced ringing state that does not make use of the positive battery, VBP. During the reduced ringing state, the ringing signal generator 126 applies a DC bias with a magnitude and direction the same as specified by the user in the ringing profile, but centered around VBH/2 instead of being located at the user programmed value. The ringing amplitude during the reduced ringing state is equal to:

$$|VBH|-|DC\ Bias|-\text{overhead voltage}, \qquad (4)$$

where the overhead voltage is about set at an implementation-specific value to avoid clipping (e.g., 8 V).

Upon identifying a ring-trip precursor event, the ringing power control unit 122 directs the ringing signal generator 126 to ramp from the present tip/ring voltages to the DC bias voltages before re-applying the reduced ringing signal. The ramp is started from the present voltages on the line is because the drive voltages might have been modified due to the action of the current limit circuit and in the interest of reducing the time of continued use of the positive battery. The ramping also prevents IVD glitches due to a sudden jump. While the ramp is being implemented and when the drive voltages have dropped to a voltage level that does not need the support of the positive battery, VBP, the usage of the positive battery is stopped, which significantly reduces the power load on the SLIC 110.

Figure 6:
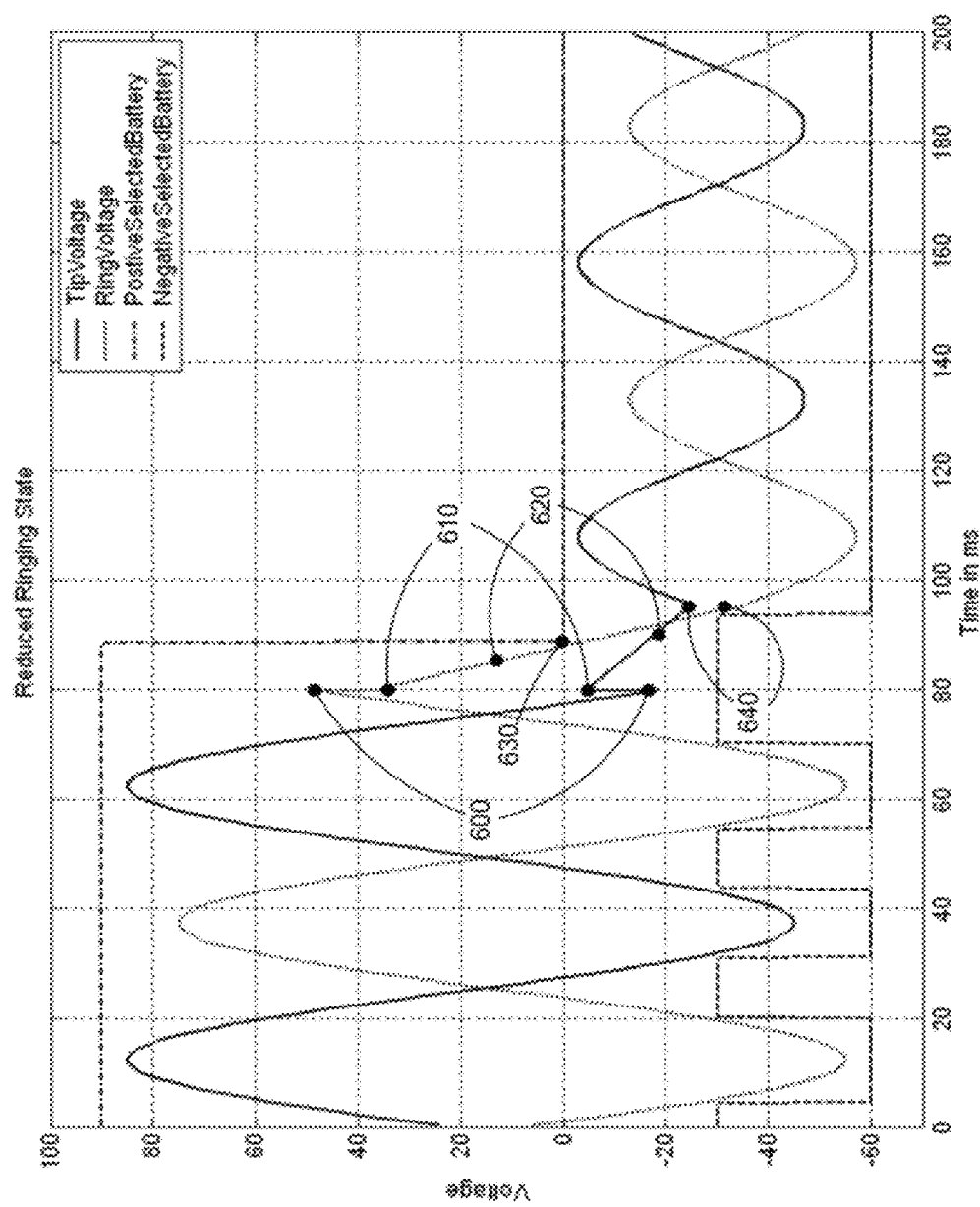
FIGS. 6 and 7 illustrate a reduced ringing signal generated by the line card of FIG. 1 in response to the identification of a ring-trip precursor.

FIG. 6 illustrates the behavior during the reduced ringing state. The off-hook condition is applied at points 600 where the tip/ring voltages suddenly collapse due to the action of the current limit circuit. The detection of a ring-trip precursor at points 610 triggers the DC bias ramps 620 in the ring and tip voltages and the positive battery is removed at point 630 during the ramps 620. The transition to the reduced ringing state occurs at points 640.

The telephony device may go back on-hook after the ring-trip precursor event is detected without the ring-trip itself being found. Such a scenario happens when testing for the 200 ohms 12 ms pre-trip load condition, where the load is removed even before the ramp is complete (i.e., which is likely to take up to 16 to 20 ms depending on the instant in time the off-hook was applied). In such cases, the ringing power control unit 122 terminates the reduced ringing. To detect the off-hook removal condition the ringing power control unit 122 has two mechanisms, a time-out based mechanism, and a load power mechanism.

Based on the operation of the ring-trip modules, the ring-trip event must be found within two ringing cycles once the reduced ringing signal is applied. If the ring-trip event has not been found after this time, the ringing power control unit 122 concludes that the telephony device has gone back on-hook and the full ringing signal is restored.

The second approach involves looking at the power that is being delivered to the load 180. If the power delivered to the load is minimal (e.g., less than 0.1 W) it indicates the absence of a resistive load, and hence, the device is on-hook. To estimate load power, instantaneous samples of the load power measurements are averaged for one complete ringing cycle.

$$P_L = V_L(\text{inst}) \cdot I_L(\text{inst}), \qquad (5)$$

Figure 7:
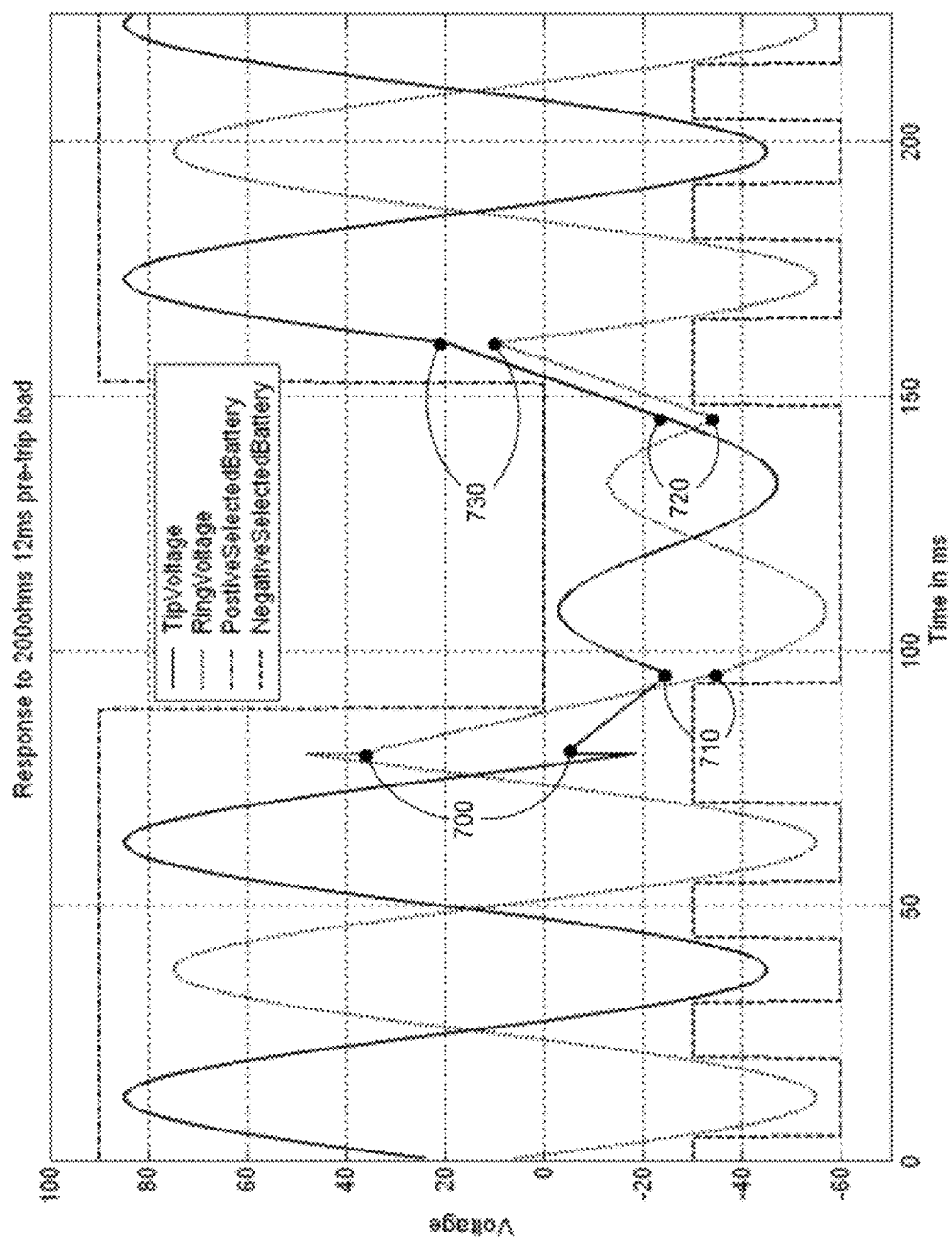

If a return to full ringing voltage is indicated by the power threshold technique or the timeout technique, the full ringing signal is reapplied. The return to the full ringing mode of operation starts with ramping from the DC biases used in the reduced ringing state back to those made use of in the full ringing state, as illustrated in FIG. 7, which shows the expected behavior during the 200 ohms 12 ms pre-trip load test.

The ring-trip precursor is identified at points 700, and the bias ramping is initiated. The load that caused the ring-trip precursor is removed by the time the reduced ringing state starts at points 710. While in the reduced ringing state, the ringing power control unit 122 determines that the load power is minimal and the full ringing signal is restored by initiating the ramp to the normal DC bias at points 720, and resuming the normal ringing signal at points 730.

Even with the reduction in ringing amplitude due to the FCL 200 and the reduced ringing amplitude state, the ring-trip would still be detected in a timely fashion using a conventional ring-trip detector. The DC ringing bias that was applied to the ringing was not modified other than by relocating it in the reduced ringing state. Therefore, the long loop detector continues to work as expected. However, with a short loop ring-trip detector, the standard short loop ring-trip threshold set equal to the programmed ringing voltage divided by the minimum of all the pre-trip REN loads that the system is expected to serve. Under heavy REN load conditions, if the SLIC power dissipation exceeds the programmed threshold, the FCL 200 would have reduced the ringing amplitude, thereby decreasing the RMS value of the load current that would be observed in the line upon a ring-trip. To compensate the short loop ring-trip detector, the user programmed short loop ring trip parameters are multiplied by the factor:

$$\frac{\text{Current Ringing Amplitude Applied}}{\text{User-specified Ringing Amplitude}}. \qquad (5)$$

By applying the scaling factor, the threshold is compensated for the ringing amplitude reduction caused by the FCL 200 or the reduced ringing and ring-trip events may be detected by the short loop detector in the full-ringing or the reduced-ringing states.

Controlling power dissipation during the ringing cycle, by adaptive controlling ringing amplitude, performing battery switching, or employing a reduced ringing cycle after identifying ring-trip precursors significantly reduces the heat generated by the SLIC 110. Reducing the heat generated allows greater device densities on the line card 100, thereby reducing the cost/per subscriber line.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A method for controlling power dissipated in a subscriber line interface circuit, comprising:

measuring a power parameter of the subscriber line interface circuit multiple times over a plurality of cycles of a ringing burst, the power parameter indicating average power dissipated in the subscriber line interface circuit;

comparing the measured power parameter at each measurement to a target power parameter for average power dissipated in the subscriber line interface circuit; and adjusting at least one ringing parameter of a ringing signal generated by the subscriber line interface circuit over the plurality of cycles of the ringing burst based on the comparisons.

2. The method of claim 1, further comprising implementing a feedback control loop operable to receive the measured power parameter and the target power parameter and generate an error signal based thereon for adjusting the ringing parameter.

3. The method of claim 2, wherein implementing the feedback control loop comprises filtering the error signal using a low pass filter.

4. The method of claim 3, wherein the low pass filter is a single pole filter having a predetermined corner frequency, and the method further comprises adjusting the corner frequency responsive to a change in the measured power parameter greater than a predetermined threshold.

5. The method of claim 3, wherein the low pass filter is a single pole filter having a predetermined corner frequency, and the method further comprises adjusting the corner frequency responsive to changing a maximum value for the ringing parameter.

6. The method of claim 2, wherein implementing the feedback control loop further comprises limiting the at least one ringing parameter based on a maximum threshold for the ringing parameter.

7. The method of claim 2, further comprising:
establishing a steady state value for the ringing parameter during the ringing cycle; and
employing the steady state value as an initial value for providing the ringing signal during a subsequent ringing cycle.

8. The method of claim 2, wherein the error signal comprises a power error signal, and implementing the feedback control loop further comprises:
converting the power error signal to a voltage error signal; and
adding the voltage error signal to a maximum value for the ringing parameter to generate the ringing parameter.

9. The method of claim 1, wherein the ringing parameter comprises an amplitude of the ringing signal.

10. The method of claim 1, wherein measuring the power parameter comprises:
measuring a current supplied by the subscriber line interface circuit;
measuring a voltage applied across the subscriber line;
measuring a battery voltage provided to the subscriber line interface circuit; and
determining the power parameter based on the measured current, the measured voltage applied across the subscriber line, the measured battery voltage, and the ringing parameter.

11. The method of claim 1, wherein a plurality of batteries are coupled to the subscriber line interface circuit, and the method further comprises switching selected batteries during the ringing cycle based on values of the ringing signal during the ringing cycle.

12. The method of claim 11, wherein the plurality of batteries includes at least a high negative battery and a low negative battery, and the method further comprises switching between the high negative battery and the low negative battery based on the values of the ringing signal.

13. The method of claim 11, wherein the plurality of batteries includes at least a positive battery, and the method further comprises switching between the positive battery and ground based on the values of the ringing signal.

14. A line card, comprising:
a subscriber line interface circuit operable to generate a ringing signal; and
a subscriber line audio-processing circuit operable to measure a power parameter of the subscriber line interface circuit multiple times over a plurality of cycles of a ringing burst, the power parameter indicating average power dissipated in the subscriber line interface circuit, compare the measured power parameter at each measurement to a target power parameter for average power dissipated in the subscriber line interface circuit, and adjust at least one ringing parameter of the ringing signal over the plurality of cycles of the ringing burst based on the comparisons.

15. The line card of claim 14, wherein the subscriber line audio-processing circuit includes a ringing power control unit operable to implement a feedback control loop to receive the measured power parameter and the target power parameter and generate an error signal based thereon for adjusting the ringing parameter.

16. The line card of claim 15, the feedback control loop comprises a low pass filter operable to filter the error signal.

17. The line card of claim 16, wherein the low pass filter is a single pole filter having a predetermined corner frequency, and the ringing power control unit is operable to adjust the corner frequency responsive to a change in the measured power parameter greater than a predetermined threshold.

18. The line card of claim 16, wherein the low pass filter is a single pole filter having a predetermined corner frequency, and the ringing power control unit is operable to adjust the corner frequency responsive to a change in a maximum value for the ringing parameter.

19. The line card of claim 15, wherein the feedback control loop further comprises a limiting unit operable to limit the at least one ringing parameter based on a maximum threshold for the ringing parameter.

20. The line card of claim 15, further comprising a state machine operable to control the feedback control loop, store a steady state value for the ringing parameter during the ringing cycle, and provide the stored steady state value as an initial value for the feedback control loop during a subsequent ringing cycle.

21. The line card of claim 15, wherein the error signal comprises a power error signal, and the feedback control loop further comprises a conversion unit operable to convert the power error signal to a voltage error signal.

22. The line card of claim 14, wherein the ringing parameter comprises an amplitude of the ringing signal.

23. The line card of claim 14, further comprising:
a plurality of batteries operable to provide a battery voltage signal to the subscriber line interface circuit;
battery voltage sense circuitry operable to measure the battery voltage signal;
loop voltage sense circuitry operable to measure a voltage applied across the subscriber line;
current sensing circuitry in the subscriber line interface circuit operable to measure a current supplied by the subscriber line interface circuit;
a ringing signal generator in the subscriber line audio-processing circuit operable to generate the ringing signal using the ringing parameter, wherein the subscriber line audio-processing circuit is operable to determine the power parameter based on the measured current, the measured voltage applied across the subscriber line, the measured battery voltage, and the ringing parameter.

24. The line card of claim 14, further comprising a plurality of batteries coupled to the subscriber line interface circuit, the subscriber line interface circuit comprises battery selection circuitry operable to select individual ones of the batteries, and the subscriber line audio-processing circuit includes a battery selection control unit operable to interface with the battery selection circuitry to switch the selected batteries during the ringing cycle based on values of the ringing signal during the ringing cycle.

25. The line card of claim 24, wherein the plurality of batteries includes at least a high negative battery and a low negative battery, and the battery selection control unit is operable to switch between the high negative battery and the low negative battery based on the value of the ringing signal.

26. The line card of claim 24, wherein the plurality of batteries includes at least a positive battery, and the battery selection control unit is operable to switch between the positive battery and ground based on the value of the ringing signal.

27. The method of claim 1, wherein adjusting the at least one ringing parameter comprises adjusting the at least one ringing parameter during a zero crossing of the ringing signal.

28. The line card of claim 14, wherein the a subscriber line audio-processing circuit is operable to adjust the at least one ringing parameter during a zero crossing of the ringing signal.

* * * * *